Sept. 22, 1970  A. R. DEY  3,529,375
ULTRA-SENSITIVE FISH-BITE INDICATOR
Filed May 17, 1968
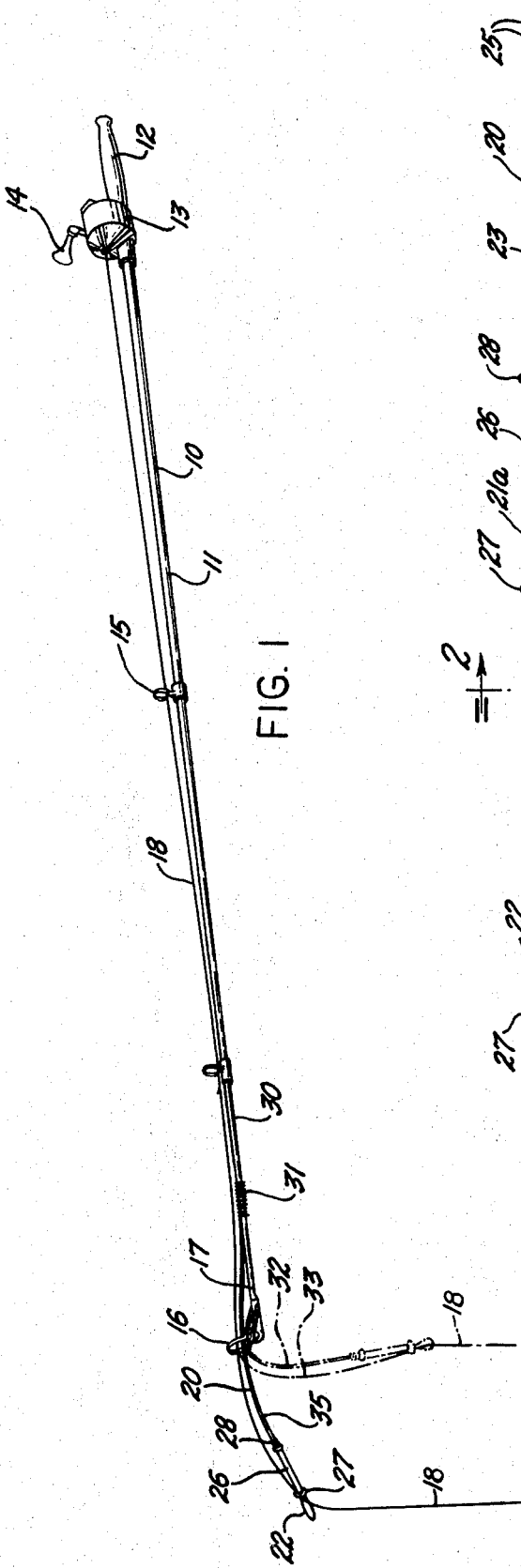
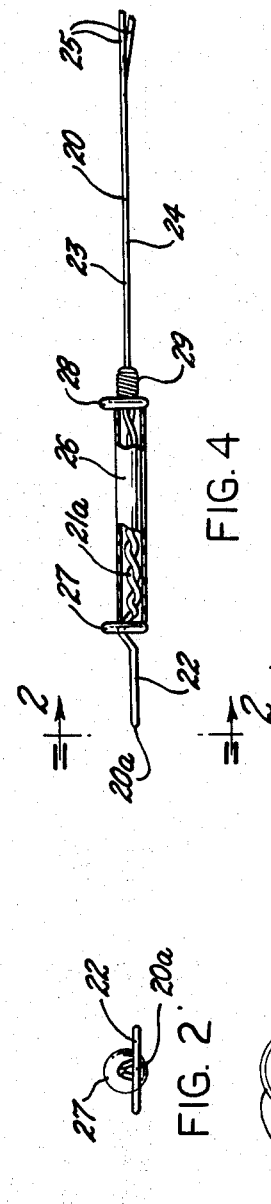
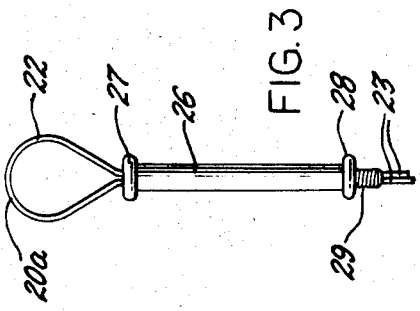
INVENTOR.
ARTHUR R. DEY
BY
Gerald R Hershberger
ATTORNEY United States Patent Office 3,529,375
Patented Sept. 22, 1970

3,529,375
ULTRA-SENSITIVE FISH-BITE INDICATOR
Arthur R. Dey, 652 Lake Angelus Road,
Pontiac, Mich. 48055
Filed May 17, 1968, Ser. No. 730,154
Int. Cl. A01k 97/12
U.S. Cl. 43—17                                    2 Claims

ABSTRACT OF THE DISCLOSURE

A fish-bite indicator for a fishing rod including a flexible fine drawn spring-tempered rust-proof wire having an annular cross-sectional modulus substantially less than the cross-sectional modulus of the tip of the rod and fastened to the tip end of the rod in cantilever fashion, the wire having an eyelet at its free end for passage of the fishing line therethrough and a brightly colored indicator member fastened to the wire adjacent said eyelet. The cross-sectional modulus and length of the wire is predetermined to support only an ultra-lightweight bait and operable to flex in response to the slightest movement of the bait. The wire is also capable of being bent intermediately about its length in inverted U outline again and again from the pull of a fighting fish without breaking or taking a permanent set, the greater sectional modulus of said fishing rod supporting and carrying the weight and pull of the fish for playing and landing purposes.

---

This invention relates to fishing equipment and more particularly to a fish bite indicator for use with a conventional fishing rod, line, and very light-weight bait.

The inventor has found that although various types of visual bite-signalling devices have been utilized in the past for catching fish through the ice, none of these devices, in his opinion, are satisfactory for handling the very lightweight baits, such as weighted flies, and small baited hooks, and the fish often either escape with the bait without being hooked, or their presence is not detected, the fish having become "educated" to avoid being caught with the devices of the prior art. The instant device solves the problem of "educated" fish by providing an ultra-sensitive fish bite indicator which when combined with a conventional rod provided with light-weight line and bait will indicate to the fisherman the slightest movement of the bait when fishing. The instant device is preferably used when still-fishing through the ice where its ultra-sensitivity is best utilized. The bait is moved slowly upwards towards the ice from the lake bottom and when the lure is taken by a fish its ultra-sensitivity immediately makes the fisherman aware of the fish bite; and likewise when the ultra light-weight lure is lowered slowly towards the bottom of the lake a fish rising to the lure or bait will become immediately apparent to the fisherman and he can set the hook.

It is, therefore, an object of this invention to provide fishermen with an ultra-sensitive, structurally and functionally distinct fish bite indicator which is an advancement and improvement over the prior art.

It is a further object of this, my invention, to provide an ultra-sensitive fish bite indicating means comprised of a fishing rod and a comparatively short length of fine spring-tempered rust-proof wire having a line-guide loop formed at one end thereof and a brightly-colored visual indicating member attached to said wire adjacent said line-guide loop, which wire is connected to the outermost tip end of the rod opposite the handle thereof and threaded through the terminal line guide-eye of said rod to position said line-guide loop a substantial distance beyond said fishing rod terminal line-guide eye.

It is a further object of this invention to provide an ultra-sensitive fish bite indicator comprised of a relatively short length of spring-tempered rust-proof wire of between .007 and .011 inch in diameter in cross-section reversely bent at one end thereof to provide a fish lineguide loop, and further having a brightly colored visual indicator member fixedly fastened to said wire adjacent said loop.

These together with other objects and advantages which will become apparent reside in the details of construction and operation as more fully hereinafter described and claimed, reference being had to the accompanying drawing forming a part hereof, wherein like numerals refer to like parts throughout, and in which:

FIG. 1 is a view in perspective of a fishing rod combined with means providing the ultra-fine signalling results desired and showing the same in use;

FIG. 2 is an end view taken in the direction of arrows 2—2 of FIG. 4.

FIG. 3 is a view shown on a larger scale of the loop end of the device and the brightly-colored visual signalling member.

FIG. 4 is a view on a larger scale showing an elevational view of the device and its various parts.

Referring now to the drawing and with particular regerence to FIG. 1, the fishing rod, which may be said to be of the conventional simple or ordinary type is denoted generally by the numeral 10 and comprises the primary rod portion 11 which is provided with a suitable handle or handgrip 12 at the rearward end. The usual spool or reel is denoted by the numeral 13 and is mounted by suitable means, not shown, on the handle. The reel 13 is provided with a handcrank 14 and the rod portion 11 is provided with a plurality of line guide eyes including an intermediate eye 15 and an eye or eye closure 16 mounted at the forward tip 17 of said rod portion for guiding and controlling line 18. The essence of the invention, whether it be treated as an auxiliary member as in FIG. 4, or as a cooperable part of the rod and reel assembly in FIG. 1 for ultra-sensitive fishing, is characterized by the readily attached ultrasensitive fish bite feeling and indicating means which includes a relativley short length of flexible spring wire 20 preferably rust proof, generally known as eskelastuna weed guard wire, of between .007 and .011 inch in diameter for reasons that will subsequently become apparent to the reader hereof. Said wire 20 is reversely bent upon itself at substantially the center 20a and the resutling strands 23 are twisted about each other adjacent center 20a at 21a to form a pear-shaped line guide loop 22, said strands 23 then extending parallel to each other rearwardly of said loop to provide an indicator body portion 24 and end attachment portion 25. The forward twististed portion 21a is covered with a short length of comparatively small diameter plastic tubing 26 of bright color which is held fixedly to said wire 20 adjacent said loop 22 by means of a front bead 27 mounted adjacent said loop and a rearward bead 28 urging said tubing member 26 against said front bead and a wrapping cord 29 mounted adjacent said rearward bead. The sectional modulus and bending moment of said wire 20 is predetermined to support only light weight bait or lures and is greatly less than the sectional modulus of the forward portion 30 of said primary rod portion 11. The cross-sectional area of the tip end of said primary rod portion is substantially 25 times greater than that of the wire 20. The end attachment portion 25 of said wire 20 is securely fastened in parallel relationship to said forward rod portion 30 by a rod wrapping cord 31 wrapped about the rod and said wire 20 adjacent said rod tip terminal eye 16, so that the body portion 24 extends forwardly through said line guide eye 16, and the loop 22 is positioned in cantilever fashion forwardly of said eye 16. The fishing line 18 is threaded from the reel 13 through said intermediate eye 15, said rod tip terminal eye 16 and thence through said loop 22, and a bait or lure of very lightweight composition is attached to said line. When a fish is attracted to said bait or lure and nibbles at same, the ultra-sensivity of said indicator brings this fact to the attention of the fisherman by the flexing of said wire in response thereto and consequently of said plastic member 26. When the fish takes the bait and is actually hooked, the wire, being readily flexible and tempered, follows the contour 32 of the line 18, and may be bent at substantially right angles to the rod or pole as indicated at 33 in the outline of an inverted U without taking a set, and will return to its former static position 35 upon landing of the fish, the primary rod 11 operating to carry the main load in landing the fish.

It will be evident to the user, as it has been and is to the inventor, that use of the ultra-sensitive fish-bite feeler and indicator herein described will enable him to more readily catch the wary "educated" fish by detecting the most minute movement of the bait or lure in a manner more sensitive and effective than other prior art adaptations and heretofore unknown in the art. This device, when utilizing a lure or bait weighing less than $\frac{1}{100}$ of an ounce, will indicate a fish bite immediately to the fisherman when the bait is being lowered, because the sensitive wire will immediately flex upward or downward in response thereto.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a fishing rod having a handle at its reel end, a forward rod portion, a line-guide eye closure fixed in place on said forward rod portion at the outermost tip of said rod for guiding a fishing line associated with said rod;

a readily attachable ultra-sensitive fish-bite feeling and indicating means for said fishing rod comprising a flexible fine drawn spring tempered rust proof wire member relatively short in length in comparison with the length of said rod having an annular cross-sectional modulus substantially less than the cross sectional modulus of said tip of said rod;

said wire member having a rearward end portion, an elongated body portion adjacent said rearward portion generally straight in outline when at rest, a line-guide loop formed from the forward end of the wire opposite said rearward portion for receiving the fishing line;

and a generally small, brightly colored annular indicator member fixedly fastened to said wire member adjacent said loop, said rearward end portion of said member being securely fastened to said rod in substantially parallel relationship to said forward rod portion adjacent to and rearwardly of said rod tip terminal guide-eye closure, said body portion being passed linearly along with the fishing line forwardly through said tip eye closure causing said wire loop to extend outwardly from said forward rod portion a predetermined distance in cantilever fashion, and said body portion being mounted and supported within said terminal guide-eye closure, said annular cross-sectional modulus and length of said feeler wire predetermined to support only an ultra light-weight lure, said feeler wire operable to flex in response to the slightest movement of the lure to indicate that the weight of the lure is not being supported by said wire if a fish intercepts the lure and to be bent intermediately thereof in inverted U outline substantially normal to said forward rod portion adjacent said terminal eye again and again from the pull of a fighting fish without breaking or taking a permanent set, the greater sectional modulus of said fishing rod supporting and carrying the weight and pull of the fish for playing and landing purposes.

2. An ultra-sensitive fish-bite indicating means for a fishing rod and line comprising;

a comparatively short length generally straight fine drawn spring tempered rust proof wire member between .007 and .011 inch in diameter folded at the center portion thereof to define a closed line guide loop for receiving the fishing line and two elongated, substantially parallel, and generally equal length legs generally straight in outline when free of tension for mounting to the tip of the fishing rod in cantilever fashion for supporting from said loop only an ultra light-weight lure in its free state, said wire member operable to flex in response to the slightest movement of the lure to indicate that the lure is being intercepted by a fish and operable to be bent intermediately about itself in substantially inverted U outline again and again from the pull of a fighting fish without breaking or taking a permanent set, the fishing rod being of substantially greater sectional modulus than said wire member for supporting and carrying the relatively greater weight and pull of the fighting fish for landing purposes, and a bright colored visual indicating member mounted on said wire member adjacent said loop responsive to the movement of the fishing line to move said wire member to visually aid the fisherman in seeing the fine wire flex in response to the slightest indication that a fish is biting on the lure at the end of the fishing line.

References Cited

UNITED STATES PATENTS

| | | | |
|---|---|---|---|
| 2,770,907 | 11/1956 | Sharer | 43—17 |
| 3,143,822 | 8/1964 | Schooley | 43—17 |

FOREIGN PATENTS

| | | |
|---|---|---|
| 966,140 | 8/1964 | Great Britain. |
| 1,003,095 | 9/1965 | Great Britain. |

SAMUEL KOREN, Primary Examiner

D. J. LEACH, Assistant Examiner

U.S. Cl. X.R.

43—25